United States Patent
Ruetschi et al.

(10) Patent No.: US 10,567,483 B2
(45) Date of Patent: Feb. 18, 2020

(54) METHOD AND APPARATUS FOR HIGH PERFORMANCE LOW LATENCY REAL TIME NOTIFICATION DELIVERY

(71) Applicant: Unify GmbH & Co. KG, Munich (DE)

(72) Inventors: Johannes Ruetschi, Boca Raton, FL (US); Rodrigo Pastro, Lake Worth, FL (US)

(73) Assignee: Unify GmbH & Co. KG, Munich (DE)

( * ) Notice: Subject to any disclaimer, the term of this patent is extended or adjusted under 35 U.S.C. 154(b) by 72 days.

(21) Appl. No.: 15/846,758

(22) Filed: Dec. 19, 2017

(65) Prior Publication Data

US 2018/0124161 A1 May 3, 2018

Related U.S. Application Data

(63) Continuation of application No. 14/962,059, filed on Dec. 8, 2015, now abandoned, which is a continuation of application No. 13/877,559, filed as application No. PCT/US2012/037869 on May 15, 2012, now abandoned.

(51) Int. Cl.
*G06F 15/16* (2006.01)
*H04L 29/08* (2006.01)
*H04L 29/06* (2006.01)

(52) U.S. Cl.
CPC .......... *H04L 67/10* (2013.01); *H04L 65/1006* (2013.01)

(58) Field of Classification Search
CPC .............................. H04L 67/42; H04L 67/26
USPC ................ 709/201, 203, 206, 217, 219, 220
See application file for complete search history.

(56) References Cited

U.S. PATENT DOCUMENTS

| | | | |
|---|---|---|---|
| 6,668,169 B2 * | 12/2003 | Burgan | H04L 12/1827 455/412.1 |
| 7,787,440 B1 * | 8/2010 | Chaturvedi | H04W 28/06 370/352 |
| 8,205,074 B2 | 6/2012 | Hoshino et al. | |
| 8,209,567 B2 | 6/2012 | Cohen et al. | |
| 2004/0255302 A1 | 12/2004 | Trossen | |

(Continued)

FOREIGN PATENT DOCUMENTS

CN 1984090 A 6/2007

OTHER PUBLICATIONS

Roach, A.B., "RFC 3265: Session Initiation Protocol (SIP)—Specific Event Notification", Network Working Group Request for Comments, 2002, pp. 1-38, vol. XP-002280672.

(Continued)

*Primary Examiner* — Liang Che A Wang
*Assistant Examiner* — Kaylee J Huang
(74) *Attorney, Agent, or Firm* — Buchanan Ingersoll & Rooney PC

(57) ABSTRACT

A method for real time notification delivery comprises providing to an application server event notifications directed to a plurality of user agents that are at a site remote from an application server and that receive event notifications through a first network device that is capable of receiving aggregated notification messages, aggregating a plurality of event notifications directed to a plurality of user agents to create an aggregated notification message directed to a first network device, and routing an aggregated notification message to a first network device via a communications network.

19 Claims, 2 Drawing Sheets

(56) References Cited

U.S. PATENT DOCUMENTS

| | | |
|---|---|---|
| 2005/0021616 A1* | 1/2005 | Rajahalme .......... H04L 12/1818 |
| | | 709/204 |
| 2006/0274701 A1 | 12/2006 | Albertsson |
| 2007/0162744 A1 | 7/2007 | Hoshino et al. |
| 2008/0120428 A1 | 5/2008 | Khan et al. |
| 2008/0288347 A1 | 11/2008 | Sifry |
| 2009/0187631 A1* | 7/2009 | Su ....................... H04L 12/6418 |
| | | 709/206 |
| 2010/0070563 A1 | 3/2010 | Baker et al. |
| 2010/0306317 A1* | 12/2010 | Serr ..................... G06Q 10/107 |
| | | 709/205 |
| 2011/0010465 A1* | 1/2011 | Forte ....................... H04L 69/04 |
| | | 709/246 |
| 2011/0161436 A1 | 6/2011 | Moore |
| 2011/0252154 A1* | 10/2011 | Bunch ................. H04M 3/4217 |
| | | 709/230 |
| 2011/0281594 A1 | 11/2011 | Goldberg et al. |
| 2012/0089660 A1 | 4/2012 | Smith et al. |
| 2012/0131144 A1* | 5/2012 | Cooper ................. G06F 9/5055 |
| | | 709/219 |
| 2013/0007847 A1 | 1/2013 | Plattner et al. |
| 2013/0097251 A1 | 4/2013 | Stibel et al. |

OTHER PUBLICATIONS

International Search Report and Written Opinion for PCT/US2012/037869, dated Oct. 18, 2012.

* cited by examiner

METHOD AND APPARATUS FOR HIGH PERFORMANCE LOW LATENCY REAL TIME NOTIFICATION DELIVERY

CROSS-REFERENCE TO RELATED APPLICATIONS

This application is a continuation application of U.S. patent application Ser. No. 14/962,059, which is a continuation of U.S. patent application Ser. No. 13/877,559, which is the U.S. National Stage under 35 U.S.C. § 371 of International Application No. PCT/US2012/037869, filed May 15, 2012.

BACKGROUND OF THE INVENTION

Field of the Invention

The present invention relates to network communication systems and, more particularly, to a method and device that enables delivery of large scale real time feature notifications such as notifications for call events, presence, feature status, alarm conditions, or other events from a centralized, hosted, or cloud communications system to users at remote sites or branch offices.

Description of the Related Art

Traditionally SIP notifications are delivered via a subscription notification scheme as per RFC 3265, which is hereby incorporated by reference in its entirety. Each subscription is associated with a distinct SIP dialog that is maintained by both notifier and subscriber. As a result, when an event occurs in a centralized application the communication system sends each notification in a distinct SIP NOTIFY message on a distinct SIP dialog to the remote user agents.

This approach leads to several problems. If a communication system is sensitive to low bandwidth between the centralized communication system, the remote notification recipient's notifications are queued and sent sequentially over a data link. This results in notification delivery delay (e.g. time from event occurrence to notification delivery) as well as high inter notification latency (e.g. time between first user agent to receive the notification and last user agent to receive the notification). Low bandwidth scenarios can occur if either bandwidth cannot be allocated, or if a link failure occurs and a secondary low bandwidth backup link is used to connect to a remote site.

Additionally, sending distinct messages may cause network latency. Serialization of a large number of notifications over a high latency data link can cause increased delay for delivery of subsequent notifications. This may also causes inefficient usage of network resources since a large number of similar messages are sent from a centralized application to notification recipients at a remote site. In most usage scenarios only SIP dialog information differs between notifications sent to different user agents for the same event occurrence.

There are no known existing SIP deployments or standardization that provides message aggregation for event notifications. Existing mechanisms acting on individual messages such as Transport Layer Security ("TLS") compression or Signaling Compression ("SIGCOMP") do not achieve levels of optimization for bandwidth reduction similar to the present invention and do not address latency optimization. Further, existing mechanisms do not provide satisfactory optimization for large numbers of event notifications.

Thus there is a need for method and apparatus that is able to send aggregated event notifications in a communication network from a first location to user agents at a second remote location.

SUMMARY OF THE INVENTION

A method and apparatus embodying the present invention solves the above problems, minimizes latency of delivery, and minimizes bandwidth requirements by providing automatic discovery of branch proxy capabilities and SIP over SIP aggregation of notifications events between application server and branch proxy. The aggregation enables notifications to be delivered in a single message between application server and branch proxy. A method and apparatus embodying the present invention also provides event content compression and message size optimization and maintains a standard compliant interface towards user agents.

A method for real time notification delivery is disclosed herein. The method comprises providing to an application server event notifications directed to a plurality of user agents that are at a site remote from the application server and receiving event notifications through a first network device that is capable of receiving aggregated notification messages and aggregating a plurality of event notifications directed to the plurality of user agents to create an aggregated notification message directed to the first network device. Each of the plurality of event notifications is associated with a user agent of the plurality of user agents. The method further requires routing the aggregated notification message to the first network device via a communications network.

In another preferred embodiment the method comprises parsing the aggregated notification message into the plurality of event notifications for the plurality of user agents and transmitting each event notification to at least one of the plurality of user agents.

In still another preferred embodiment the method comprises aggregating the plurality of event notifications using a first event notification of the plurality of event notifications to aggregate the remaining plurality of event notifications.

In yet another preferred embodiment the method comprises receiving user agent notification subscriptions and generating the plurality of event notifications based on the received notification subscriptions.

In still another preferred embodiment the method comprises receiving user agent notification subscriptions comprising an identifier for a location of the first network.

In a further preferred embodiment of the method, aggregating the plurality of event notifications comprises packaging all of the plurality of event notifications into a body of the aggregated notification message.

In yet a further preferred embodiment of the method, the aggregated notification message comprises an identifier for a location of the first network device.

In yet another preferred embodiment of the method, aggregating a plurality of event notifications comprises using an index for aggregating each event notification, the index comprising information regarding the user agent to which each event notification is directed and wherein the aggregated notification message does not include the index.

In still a further preferred embodiment of the method, the notification aggregated message further comprises information indicating a number of separate event notifications in the notification aggregated message and an index for each event notification, the index comprising information regarding the user agent to which each event notification is directed.

In another preferred embodiment of the method, the body of the aggregated notification message comprises a compressed text format that includes Session Initiation Protocol ("SIP") information.

In still another preferred embodiment of the method, routing the aggregated notification message comprises a message aggregator sending the aggregated notification message to a transport function and the transport function transmitting the aggregated notification message to the first network device via a communication network.

In yet another preferred embodiment of the method, routing the aggregated notification message comprises routing the aggregated notification message according to Transport Layer Security ("TLS") transport protocol.

In a further preferred embodiment the method comprises creating a template for each of the plurality of event notifications, the template comprising notification dialog data contained in each of the event notifications and a list of each type of notification dialog data contained in the event notifications.

In yet a further preferred embodiment the method comprises receiving the notification aggregated message at the first network device and the first network device processing the aggregated notification message according to the plurality of event notifications.

In still a further preferred embodiment the method comprises the first network device sending option messages at a predefined interval to the application server and updating a capability attribute associated with the first network device upon receipt of an option message comprising aggregated notification message capability information.

In another preferred embodiment the method comprises determining whether the first network device associated with the user agents is capable of receiving aggregated notification messages.

In still another preferred embodiment of the method, aggregating the plurality of event notifications comprises the application server sending a first plurality of event notifications to a message aggregator, each of the first plurality of event notifications being associated with a user agent of the plurality of user agents, and the message aggregator receiving the first plurality of event notifications and aggregating the first plurality of event notifications based on the first network device, the aggregated first plurality of event notifications comprising the aggregated notification message.

In yet a further preferred embodiment of the method, aggregating the plurality of event notifications further comprises using an identifier for a location of the first network device such that the aggregated notification message includes the identifier for the first network device.

An apparatus for real time notification delivery is also disclosed herein. The apparatus comprises an application server that is capable of receiving event notifications directed to a plurality of user agents. The user agents are at a site remote from the application server and receive event notifications through a first network device that is capable of receiving aggregated notification messages. Further, the application server aggregates a plurality of event notifications directed to the plurality of user agents to create an aggregated notification message directed to the first network device. Each of the plurality of event notifications being associated with a user agent of the plurality of user agents. Additionally, the application server routes the aggregated notification message to the first network device via a communications network.

In another preferred embodiment of the apparatus, the application server aggregates the plurality of event notifications by packaging all of the plurality of event notifications into a body of the aggregated notification message.

In yet another preferred embodiment of the apparatus, the body of the aggregated notification message comprises a compressed text format that includes Session Initiation Protocol ("SIP") information.

In still another preferred embodiment of the apparatus, the application server receives user agent notification subscription information and aggregates the plurality of event notifications based on the received notification subscriptions.

In a further preferred embodiment of the apparatus, the first network device is an SIP proxy server.

The present invention is applicable to any large scale, hosted or cloud based communication system where real time events services are provided from centralized applications to one or more remote offices locations. Other details, objects, and advantages of the invention will become apparent as the following description of certain present preferred embodiments thereof and certain present preferred methods of practicing the same proceeds

BRIEF DESCRIPTION OF THE FIGURES

Present preferred devices, systems, and apparatuses for High Performance Low Latency Real Time Notification Delivery are shown in the accompanying drawings and certain present preferred methods of practicing the same are also illustrated therein. It should be understood that like reference numbers used in the drawings may identify like components.

DESCRIPTION OF THE PREFERRED EMBODIMENTS

Figure 1:
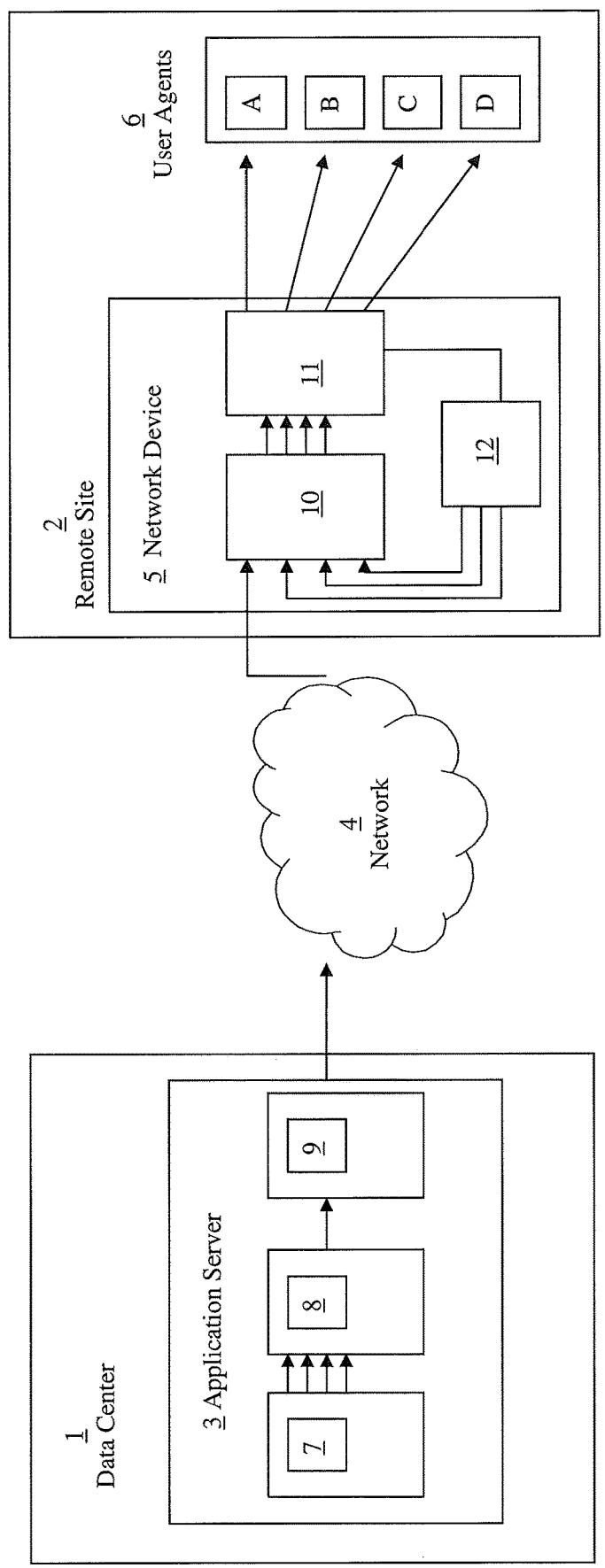
FIG. 1 is a block diagram of a first preferred embodiment of a communication system that includes an apparatus of the present invention.

Referring to FIG. 1, an apparatus for real time notification delivery may include an application server 3 located in a data center 1 that is part of a communication network 4. The application server 3 receives event notifications directed to a plurality of user agents 6. Individual agents are represented by boxes A, B, C, and D. Event notifications may include notifications for call events, presence, feature status, alarm conditions, or other events from a centralized, hosted, or cloud communications system. In addition, the event notifications may include an identifier for a remote site, such as a branch office, to which the event notification is directed, a number of notifications to be sent that remote site, and/or an index for each event notification that enables easy aggregation. Further, more than one event notification may be directed to a single user agent 6. In a preferred embodiment, the user agents 6 may be Session Initiation Protocol ("SIP") user agents, the event notifications are SIP event notifications, and the user agents 6 and the application server 3 are connected via the first network device 5, which is a survivable branch proxy.

The user agents 6 may comprise software applications or hardware applications such as endpoints or terminals. Further, a user agent 6 may be a mobile communication device such as for example; a mobile phone, a computer, a laptop, a personal digital assistant, a netbook, or a tablet computer device or a user agent may be a non-mobile device, for example, a desktop computer or desktop phone. Embodiments of the application server 3 may include, for example, a computer device configured to host a service to a plurality of different client devices by communicating with the devices.

In a preferred embodiment, user agent notification subscriptions may be received by the data center 1, application server 3, or other network device such that the generation of the plurality of event notifications is based on the received and active notification subscriptions. The user agent notification subscriptions may include an identifier for a location of the first network in which the first network device 5 is located. In another preferred embodiment, the application server 3 may be an SIP server or it may include an SIP application 7. In another preferred embodiment, the first network device 5 is a server device. The server device may include a message queue 10 and a message extractor 12. The server device may be a branch or proxy server or it may include for example an SIP proxy function 11.

The application server 3 may generate the event notifications or it may receive the event notifications from another network device such as a server or gateway. The user agents 6 are located at a site 2 that is remote from the application server 3 and are able to receive event notifications through a first network device 5 that is capable of receiving aggregated notification messages. The capability of the first network device may be determined based on option messages sent by the first network device 5. A capability attribute associated with the first network device may be updated upon receipt of an option message that includes information indicating aggregated notification message capability.

In a preferred embodiment, the option messages may be sent at a predefined interval to the application server 3, data center 1, or other device that relays this information to the data center 1. An option message may be an SIP OPTIONS message and an SIP header of the message may include the proxy state of the first network device 5 and the proxy capability to process packaged notifications. Accordingly, the application server may dynamically update a capability attribute that is used for known proxies upon receipt of an OPTIONS message that includes Notification Aggregation capability. Upon the occurrence of an event the application notifications for all active subscription dialogs may be created and the application server or other device may determine which user agents are registered to a network device that supports notification aggregations based on a look-up table, contact information, or other form of registration information of the user agents.

Further, the application server 3 aggregates a plurality of the event notifications directed to the plurality of user agents to create an aggregated notification message that is directed to the first network device 5. Aggregation of the plurality of event notifications may take place using a first event notification of the plurality of event notifications to aggregate the remaining plurality of event notifications. Furthermore, aggregating the plurality of event notifications may comprise packaging all of the plurality of event notifications into a body of the aggregated notification message.

In addition, an identifier of a location of a network or network device may be used in the aggregation process such that the event notifications to be aggregated include the identifier or otherwise, the identifier is included in the aggregated notification message. This mechanism enables the event notifications to be aggregated based on a particular network or network device. In a situation where there are multiple remote sites that each have a network device, event notifications can be aggregated per each remote site and sent to the network device at that remote site.

In a preferred embodiment, the aggregated notification messages include an identifier for a location or address of the first network device 5 along with information that indicates a number of separate event notifications in the notification aggregated message and an index for each event notification. The index may include information regarding the user agent to which that particular event notification is directed. The index may be used to facilitate aggregation of notification events, but may or may not be sent as part of the aggregated notification message. Further, the body of the aggregated notification message may comprise a compressed text format that includes SIP information.

Figure 2:
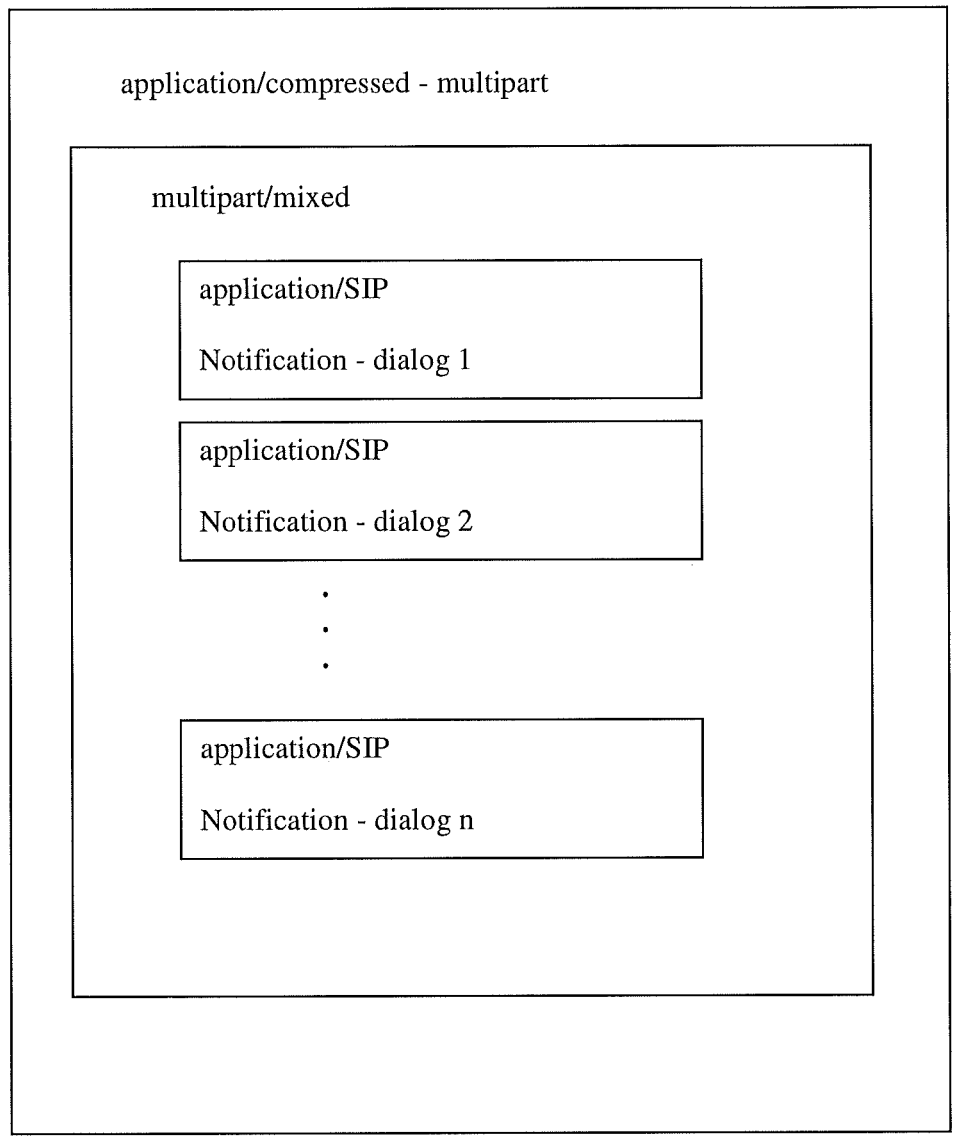
FIG. 2 is a preferred embodiment of a format of an aggregated notification message used by the present invention.

FIG. 2 illustrates a preferred embodiment of an aggregated notification message containing n notifications and associated dialogs. A content-type may be defined for attached compressed SIP messages. This content type could be defined as application/compressed-multipart. Compressed-multipart may be represented as Gzip compressed text. The compressed text is of a type multipart/mixed for which each part is of the type application/SIP. The result provides that a compressed copy of all notifications can be sent in the body of an initial notification from the centralized application to the remote SIP proxy.

In another preferred embodiment, event notifications may be aggregated to provide optimization for dialog processing. Prior to, during, or after the aggregation process, a template for each of the plurality of event notifications may be created, such that the template comprises notification dialog data contained in each of the event notifications along with a list of each type of notification dialog data contained in the event notifications.

The example code below illustrates how event notifications may be combined using an optimization approach. A message aggregator creates a template for the notification data (application/dialog-info-template). The template contains parameters for dialog related fields. The message aggregator also creates a list for all dialogs (application/dialog-list) on which the notifications have to be sent. Additionally, further optimization can be applied by using compression in order to reduce a message size.

```
NOTIFY sip:15615551234@10.161.219.26:5060;transport=udp SIP/2.0
To: 28 <sip:15615551234@10.192.129.54>;tag=e51e42326b
From: <sip:*70@10.192.129.54:5060;transport=udp>;tag=SEC11-683c00a-783c00a-1-2RFA407AbITY
Call-ID: a578e41905e23570
CSeq: 232 NOTIFY
Route: <sip:10.161.219.18;transport=tcp;r2=on;lr;ftag=e51e42326b>
Route: <sip:10.161.219.18;r2=on;lr;ftag=e51e42326b>
Contact: <sip:*70@10.192.129.54:5060;transport=tcp;maddr=10.192.129.54>
Via: SIP/2.0/UDP 10.192.129.54:5060;branch=z9hG4bESEC-683c00a-783c00a-1-Q71wu37911
```

```
Max-Forwards: 70
Event: dialog
Subscription-State: active
Content-Type: multipart/mixed;boundary="12345abcde"
Content-Length:xxxx
--12345abcde
Content-Type: application/dialog-info-template+xml
<?xml version="1.0"?>
<dialog-info xmlns="urn:ietf:params:xml:ns:dialog-info"
      version="231"
      state="full"
      entity="sip:10.192.129.54">
   <dialog id="%%From-Tag%%" call-id="%%Call-id%%"
      direction="initiator">
      <state>early</state>
      <local>
         <identity display="John Smith">sip:30@10.192.129.54</identity>
      </local>
      <remote>
         <identity>sip:814085554682@10.192.129.54</identity>
      </remote>
   </dialog>
</dialog-info>
--12345abcde
Content-Type: application/dialog-list
sip:15615551235@10.161.219.25:5060;transport=udp
To: 26 <sip:15615551235@10.192.129.54>;tag=e4f6478938
From-Tag:SEC11-683c00a-783c00a-1-s4Wf5BOon84D
Call-ID: aa59e6591d5120c0
CSeq: 828
sip:15615551236@10.161.219.128:5060;transport=udp
To: 43 <sip:15615551236@10.192.129.54>;tag=5befde7ce1
From-Tag:SEC11-683c00a-783c00a-1-0J11805P4SDI
Call-ID: cc3ca556601b5eff
CSeq: 2248
sip:15615551237@10.161.219.22:5060;transport=udp
To: 30 <sip:15615551237@10.192.129.54>;tag=b65cbd3d64
From-Tag:SEC11-683c00a-783c00a-1-2PUJc2z4NZZh
Call-ID: 012487c843ed6444
CSeq: 842
--12345abcde
```

In another preferred embodiment, the plurality of event notifications may be aggregated by a message aggregator 8. The message aggregator 8 may be a hardware or software application, which may be a component of the application server 3 or a separate device. Each of the plurality of event notifications is associated with a user agent of the plurality of user agents 6. Aggregating the plurality of event notifications may comprise the application server 3 sending a first plurality of event notifications to a message aggregator 8 such that each of the first plurality of event notifications is associated with a user agent of the plurality of user agents 6. The message aggregator receives the first plurality of event notifications and aggregates the first plurality of event notifications based on the first network device. The aggregated first plurality of event notifications comprises an aggregated notification message.

Further, the application server 3 routes the aggregated notification message to the first network device 5 via the communications network 4. In another preferred embodiment, a message aggregator 8 routes the aggregated notification message by sending the aggregated notification message to a transport function 9 and the transport function 9 transmits the aggregated notification message to the first network device 5 via a communication network 4. The aggregated notification message may preferably be routed through the communication network 4 according to Transport Layer Security ("TLS") protocol.

The first network device 5 receives the notification aggregated message and processes the aggregated notification message according to the plurality of event notifications. This may include the first network device 5 parsing the aggregated notification message into the plurality of event notifications for the plurality of user agents and initiate transmission of each event notification to at least one of the plurality of user agents.

In another embodiment, the SIP proxy function 11 may process messages from the message queue 10 by reading a notification from the queue that contains aggregated event notifications in its body. The SIP proxy function 11 removes the aggregated notifications from the body and passes them to a message extractor 12. The message extractor 12 receives the packaged notifications and rebuilds the SIP messages either by extracting them directly from the received message body or by rebuilding them based on a dialog list that was produced during aggregation. Once extracted, the notifications are placed in the message queue 10 for normal SIP processing.

The present invention also comprises a method for real time notification delivery. The method may be embodied in a non-transitory computer readable medium. Embodiments of the non-transitory computer readable medium may be, for example, memory of a computer device, such as a communication device or communication terminal, a flash drive, memory of a server, flash memory, a compact disc, an optical disc storage media, or a DVD. The medium may have an application stored thereon that defines instructions that are executable by a processor of a network device. The instructions may define the method that includes the steps of providing to an application server event notifications directed to a plurality of user agents that are at a site remote from the application server and that receive event notifications through a first network device that is capable of receiving aggregated notification messages.

The method further requires aggregating a plurality of event notifications directed to a plurality of user agents to create an aggregated notification message directed to a first network device, each of the event notifications are associated with a user agent of the plurality of user agents, and the method also requires routing an aggregated notification message to a first network device via a communications network.

The present invention optimizes bandwidth usage and latency for the delivery of notifications from a centralized, hosted, or cloud based communication system to recipients at a remote site or branch locations. The present invention minimizes delay of notification delivery caused by data link latency or data link bandwidth restrictions. The present invention also minimizes inter-notification latency and guarantees quasi-simultaneous delivery of notifications to user agents at remote sites even if data links to the remote sites have limited bandwidth or high latency.

While certain present preferred embodiments of apparatuses for High Performance Low Latency Real Time Notification Delivery and methods of making and using the same have been shown and described above, it is to be distinctly understood that the invention is not limited thereto but may be otherwise variously embodied and practiced within the scope of the following claims.

We claim:

1. A method for real time notification delivery comprising:
    providing Session Initiation Protocol (SIP) event notifications that are directed to a plurality of user agents to an application server, the user agents being at a site remote from the application server and receiving the SIP event notifications via a first network device communicatively connected to the application server and the user agents;
    aggregating, by the application server, a plurality of the SIP event notifications directed to the user agents to create an aggregated notification message that is to be directed to the first network device, each of the plurality of the SIP event notifications being associated with at least one user agent of the plurality of user agents, the aggregated notification message being created to include an index for the SIP event notifications included in the aggregated notification message, the index comprising information identifying the at least one user agent to which each SIP event notification in the aggregated notification message is directed, the aggregated notification message also comprising information identifying a location or address of the first network device, information defining a number of separate SIP event notifications included in the aggregated notification message, and a dialog list that identifies dialog data contained in each of the SIP event notifications within the aggregated notification message such that messages of the SIP event notifications are rebuildable based on the dialog list, wherein the dialog list is configured to facilitate rebuilding of the messages of the SIP event notifications identified in the aggregated notification message based on the dialog data of the dialog list;
    routing the aggregated notification message from the application server to the first network device via a communications network;
    the first network device rebuilding the messages of the SIP event notifications identified in the aggregated notification message based on the dialog list and the dialog data within the dialog list; and
    sending the messages of the SIP event notifications that were rebuilt based on the dialog list and the dialog data within the dialog list to the user agents to which the messages of the SIP event notifications are directed.

2. The method of claim 1 further comprising parsing, by the first network device, the aggregated notification message into the plurality of the SIP event notifications for the plurality of user agents and transmitting, by the first network device, each of the parsed SIP event notifications to the user agents to which the parsed SIP event notifications are directed based on information included in the aggregated notification message.

3. The method of claim 1 further comprising aggregating the plurality of the SIP event notifications using a first SIP event notification of the plurality of the SIP event notifications to aggregate the remaining plurality of the SIP event notifications.

4. The method of claim 1 further comprising receiving user agent notification subscriptions comprising an identifier for the location of the first network device.

5. The method of claim 1 further comprising receiving user agent notification subscriptions and generating the plurality of the SIP event notifications based on the received notification subscriptions.

6. The method of claim 5 wherein the aggregated notification message comprises an identifier for the location of the first network device.

7. The method of claim 1 wherein:
    the user agents comprise at least one of: terminals, endpoints, mobile communication devices, laptop computers, computers, personal digital assistants, netbooks, tablet computer devices, desktop computers, and desktop phones; and
    wherein the SIP event notifications comprise SIP event notifications for at least one of call events, user presence, feature status, and alarm conditions.

8. The method of claim 1 wherein aggregating the plurality of the SIP event notifications comprises packaging all of the plurality of the SIP event notifications into a body of the aggregated notification message.

9. The method of claim 1 wherein the index is configured to facilitate aggregation of the SIP event notifications.

10. The method of claim 1 wherein routing the aggregated notification message comprises a message aggregator sending the aggregated notification message to a transport function and the transport function transmitting the aggregated notification message to the first network device via the communication network.

11. The method of claim 1 further comprising creating a template for each of the plurality of the SIP event notifications, the template comprising notification dialog data contained in each of the SIP event notifications and a list of each type of notification dialog data contained in the SIP event notifications.

12. The method of claim 1 further comprising:
    receiving the aggregated notification message at the first network device; and
    the first network device processing the aggregated notification message based on information included in the aggregated notification message received by the first network device so that each of the SIP event notifications is sent from the first network device to the user agent to which the SIP event notification is directed by:
   extracting all notifications in the aggregated notification message by rebuilding the messages of the SIP event notifications from a body of the aggregated notification message based on the dialog list; and
wherein the sending the messages of the SIP event notifications that were rebuilt based on the dialog list and the dialog data within the dialog list to the user agents to which the messages of the SIP event notifications are directed comprises sending each of the messages of the SIP event notifications that were rebuilt from the body of the aggregated notification message based on the dialog list to a message queue for sending each of the messages of the SIP event notifications rebuilt from the body of the aggregated notification message based on the dialog list to the user agent to which that SIP event notifications is addressed.

13. The method of claim 1 further comprising:
the first network device sending SIP option messages at a predefined interval to the application server; and
updating a capability attribute associated with the first network device upon receipt of an SIP option message of the SIP option messages sent by the first network device that included aggregated notification message capability information.

14. The method of claim 13 further comprising determining whether the first network device associated with the user agents is capable of receiving the aggregated notification messages based on the SIP option message of the SIP option messages sent by the first network device that included the aggregated notification message capability information.

15. The method of claim 1 wherein aggregating the plurality of the SIP event notifications comprises the application server sending a first plurality of event notifications to a message aggregator, each of the first plurality of the SIP event notifications being associated with at least one user agent of the plurality of user agents, and the message aggregator receiving the first plurality of the SIP event notifications and aggregating the first plurality of the SIP event notifications based on the first network device to form the aggregated notification message.

16. The method of claim 15 wherein aggregating the plurality of the SIP event notifications further comprises using an identifier for the location of the first network device such that the aggregated notification message includes the identifier for the first network device.

17. An apparatus for real time notification delivery comprising:
an application server having non-transitory computer readable medium connected to at least one processor; and
the application server being configured to receive Session Initiation Protocol (SIP) event notifications directed to a plurality of user agents, the user agents being at a site remote from the application server, the user agents being communicatively connected to a first network device to receive the SIP event notifications via the first network device;
the application server configured to aggregate a plurality of the SIP event notifications directed to the plurality of user agents to create an aggregated notification message to be directed to the first network device, each of the SIP event notifications being associated with a user agent of the plurality of user agents, the aggregated notification message being created to include an index for the SIP event notifications included in the aggregated notification message, the index comprising information identifying the user agent to which each SIP event notification in the aggregated notification message is directed, the aggregated notification message also comprising information identifying a location or address of the first network device, a dialog list that identifies dialog data contained in each of the SIP event notifications within the aggregated notification message such that messages of the SIP event notifications are rebuildable based on the dialog list, and information defining a number of separate SIP event notifications included in the aggregated notification message, wherein the dialog list is configured to facilitate rebuilding of the messages of the SIP event notifications identified in the aggregated notification message based on the dialog data of the dialog list;
the application server configured to route the aggregated notification message to the first network device via a communications network;
the first network device configured to rebuild the messages of the SIP event notifications identified in the aggregated notification message based on the dialog list and the dialog data within the dialog list and send the messages of the SIP event notifications that were rebuilt based on the dialog list and the dialog data within the dialog list to the user agents to which the messages of the SIP event notifications are directed.

18. The apparatus of claim 17
wherein the application server aggregates the plurality of the SIP event notifications by packaging all of the plurality of the SIP event notifications into a body of the aggregated notification message, the SIP event notifications comprising SIP event notifications for at least one of call events, user presence, feature status, and alarm conditions;
wherein the body of the aggregated notification message comprises a compressed text format that includes SIP information.

19. The apparatus of claim 18, wherein:
the user agents are comprised of at least one of: terminals, endpoints, mobile communication devices, laptop computers, computers, personal digital assistants, netbooks, tablet computer devices, desktop computers, and desktop phones.

\* \* \* \* \*